United States Patent
Lu et al.

(10) Patent No.: US 12,129,043 B1
(45) Date of Patent: Oct. 29, 2024

(54) AIRCRAFT HEAT EXCHANGER BYPASS FLOW CONTROL WITH ELECTRIC MOTOR

(71) Applicant: Pratt & Whitney Canada Corp., Longueuil (CA)

(72) Inventors: Xuening Lu, Oakville (CA); Ezzat Meshkinfam, Mississauga (CA); Thomas Trevor Ricci, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/238,755

(22) Filed: Aug. 28, 2023

(51) Int. Cl.
*B64D 33/08* (2006.01)
*F01M 5/00* (2006.01)
*F16K 1/22* (2006.01)
*F16K 31/04* (2006.01)

(52) U.S. Cl.
CPC ............ *B64D 33/08* (2013.01); *F01M 5/005* (2013.01); *F16K 1/22* (2013.01); *F16K 31/041* (2013.01)

(58) Field of Classification Search
CPC ........... F02C 7/14; F02C 7/141; F01M 5/002; F01M 5/005; F01M 5/007; F01P 7/16; F01P 2007/146; F01P 7/00; F01P 7/14; F01P 7/161; F01P 2007/168; F16N 2210/02; F16N 39/00; F16N 39/02; F16K 1/22; F16K 31/041
USPC ............................................. 184/104.3, 6.22
See application file for complete search history.

(56) References Cited

U.S. PATENT DOCUMENTS

| | | | | |
|---|---|---|---|---|
| 2,865,580 A * | 12/1958 | Marshall | ................ | B64D 33/08 244/57 |
| 3,300,965 A * | 1/1967 | Sherlaw | .................... | F02C 7/14 184/104.3 |
| 8,297,038 B2 * | 10/2012 | Stretton | ................. | B64D 29/04 60/785 |
| 9,097,169 B2 * | 8/2015 | Logan | ...................... | F02C 7/06 |
| 9,658,005 B2 * | 5/2017 | Elder | ....................... | F28D 1/053 |
| 10,208,669 B2 * | 2/2019 | Gameiro | .................... | F02C 7/14 |
| 10,508,598 B2 * | 12/2019 | Weiner | ....................... | F02C 7/06 |
| 10,900,422 B2 * | 1/2021 | Logan | ...................... | F28F 27/02 |
| 11,585,429 B2 * | 2/2023 | Remboski | ................ | H02K 9/19 |
| 11,591,964 B2 * | 2/2023 | Walz | ........................ | F01D 25/20 |
| 11,629,640 B2 * | 4/2023 | Smith | ........................ | F02C 7/16 60/773 |
| 2009/0313999 A1 * | 12/2009 | Hunter | ...................... | F02C 7/18 60/730 |
| 2011/0232293 A1 * | 9/2011 | Leese | ........................ | F02C 7/185 165/41 |

(Continued)

*Primary Examiner* — Henry Y Liu

(74) *Attorney, Agent, or Firm* — Getz Balich LLC

(57) ABSTRACT

A system is provided for an aircraft. This aircraft system includes a heat exchanger, a lubricant flow circuit and a bypass valve. The lubricant flow circuit includes an inlet passage, an outlet passage, a heat exchanger passage and a bypass passage. The heat exchanger passage extends through the heat exchanger. The bypass passage bypasses the heat exchanger. The heat exchanger passage and the bypass passage are fluidly coupled in parallel between the inlet passage and the outlet passage. The bypass valve is fluidly coupled inline along the lubricant flow circuit. The bypass valve is operable to regulate lubricant flow through the bypass passage. The bypass valve includes a rotary electric motor.

20 Claims, 3 Drawing Sheets

(56) References Cited

U.S. PATENT DOCUMENTS

| | | | |
|---|---|---|---|
| 2012/0132413 A1* | 5/2012 | Cheadle | F28F 27/02 165/297 |
| 2014/0223917 A1* | 8/2014 | Gameiro | F02C 7/12 60/730 |
| 2016/0047561 A1* | 2/2016 | Army, Jr. | B23P 15/26 137/624.27 |
| 2016/0341074 A1* | 11/2016 | Fang | F01D 25/18 |
| 2017/0167382 A1* | 6/2017 | Miller | B64D 15/06 |
| 2018/0100709 A1* | 4/2018 | Gopal | F01P 3/02 |
| 2019/0107037 A1* | 4/2019 | Qiu | G05D 23/025 |
| 2021/0071551 A1* | 3/2021 | Ni | F01M 1/02 |
| 2021/0088124 A1* | 3/2021 | Remboski | H02K 9/19 |
| 2023/0071735 A1* | 3/2023 | Smith | F02C 3/04 |
| 2023/0125205 A1* | 4/2023 | Kunatharaju | B60K 11/02 236/34.5 |

\* cited by examiner

AIRCRAFT HEAT EXCHANGER BYPASS FLOW CONTROL WITH ELECTRIC MOTOR

TECHNICAL FIELD

This disclosure relates generally to a heat exchanger system and, more particularly, to flow control through a bypass around a heat exchanger.

BACKGROUND INFORMATION

Various cooling systems and methods are known in the art. Some of these cooling systems and methods are capable of directing process fluid through a bypass around a heat exchanger using a passive thermal valve. While these known cooling systems and methods have various benefits, there is still room in the art for improvement.

SUMMARY

According to an aspect of the present disclosure, a system is provided for an aircraft. This aircraft system includes a heat exchanger, a lubricant flow circuit and a bypass valve. The lubricant flow circuit includes an inlet passage, an outlet passage, a heat exchanger passage and a bypass passage. The heat exchanger passage extends through the heat exchanger. The bypass passage bypasses the heat exchanger. The heat exchanger passage and the bypass passage are fluidly coupled in parallel between the inlet passage and the outlet passage. The bypass valve is fluidly coupled inline along the lubricant flow circuit. The bypass valve is operable to regulate lubricant flow through the bypass passage. The bypass valve includes a rotary electric motor.

According to another aspect of the present disclosure, another system is provided for an aircraft. This aircraft system includes a heat exchanger, a lubricant flow circuit and a bypass valve. The lubricant flow circuit includes an inlet passage, an outlet passage, a heat exchanger passage and a bypass passage. The heat exchanger passage extends through the heat exchanger. The bypass passage bypasses the heat exchanger. The heat exchanger passage and the bypass passage are between and fluidly coupled in parallel with the inlet passage and the outlet passage. The bypass valve is fluidly coupled inline along the lubricant flow circuit. The bypass valve is operable to regulate lubricant flow through the bypass passage. The bypass valve includes a variable speed electric motor.

According to still another aspect of the present disclosure, another system is provided for an aircraft. This aircraft system includes a heat exchanger, a fluid flow circuit and a valve system. The fluid flow circuit includes an inlet passage, an outlet passage, a heat exchanger passage and a bypass passage. The heat exchanger passage extends through the heat exchanger. The bypass passage bypasses the heat exchanger. The heat exchanger passage and the bypass passage are between and fluidly coupled in parallel with the inlet passage and the outlet passage. The valve system includes a bypass valve and a control valve. The bypass valve is fluidly coupled inline along the fluid flow circuit. The valve system is operable to regulate fluid flow through the bypass passage using the bypass valve based on a temperature of fluid flowing in the fluid flow circuit. The bypass valve includes an electric motor. The control valve is fluidly coupled inline along the fluid flow circuit downstream of the bypass valve. The valve system is operable to regulate fluid flow in the-inlet passage using the control valve based on a pressure of the fluid flowing in the fluid flow circuit.

The bypass valve may also include a valve element. The electric motor may include a rotary electric motor operatively connected to the valve element.

The aircraft system may also include a controller operable to control operation of the rotary electric motor based on a lubricant parameter.

The lubricant parameter may be a temperature of lubricant flowing in the lubricant flow circuit.

The lubricant parameter may be a pressure of lubricant flowing in the lubricant flow circuit.

The controller may be operable to control operation of the rotary electric motor to maintain the lubricant parameter within an operating range.

The controller may be operable to control operation of the rotary electric motor to maintain the lubricant parameter above a maximum operating threshold.

The controller may be operable to control operation of the rotary electric motor to maintain the lubricant parameter below a minimum operating threshold.

The aircraft system may also include a sensor operatively connected to the lubricant flow circuit. The sensor may be operable to communicate sensor signal to the controller indicative of the lubricant parameter.

The sensor may be operatively connected to the lubricant flow circuit at a point that is fluidly downstream of the heat exchanger passage and the bypass passage.

The bypass valve may also include a valve element operatively connected to the rotary electric motor. The controller may be operable to control operation of the rotary electric motor to move the valve element between an open position and a closed position. The bypass valve may be operable to fluidly couple the inlet passage to the outlet passage with the bypass passage when the valve element is in the open position. The bypass valve may be operable to fluidly decouple the inlet passage from the outlet passage along the bypass passage when the valve element is in the closed position.

The controller may also be operable to control operation of the rotary electric motor to move the valve element to and remain at one or more intermediate positions between the open position and the closed position.

The bypass valve may also include a valve element. The rotary electric motor may include a motor stator and a motor rotor operatively connected to the valve element.

The rotary electric motor may be configured as a variable frequency electric motor operable to decouple system dynamic resonances of the system.

The rotary electric motor may be configured as a variable speed electric motor.

The rotary electric motor may be configured as a stepper motor.

The rotary electric motor may be configured as a direct current motor.

The rotary electric motor may be configured as an alternating current motor.

The aircraft system may also include a control valve fluidly coupled inline along the lubricant flow circuit upstream of the bypass valve. The control valve may be operable to regulate lubricant flow in the inlet passage upstream of the heat exchanger passage and the bypass passage.

The bypass valve may be actuated based on a temperature of lubricant flowing in the lubricant flow circuit. The control valve may be actuated based on a pressure of the lubricant flowing in the lubricant flow circuit.

The heat exchanger may be configured as or otherwise include a liquid-to-air heat exchanger.

The heat exchanger may be configured as or otherwise include a liquid-to-liquid heat exchanger.

The aircraft system may also include an aircraft engine and a heat exchange system including the heat exchanger, the lubricant flow circuit and the bypass valve. The outlet passage may be fluidly coupled with and upstream of one or more components of the aircraft engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
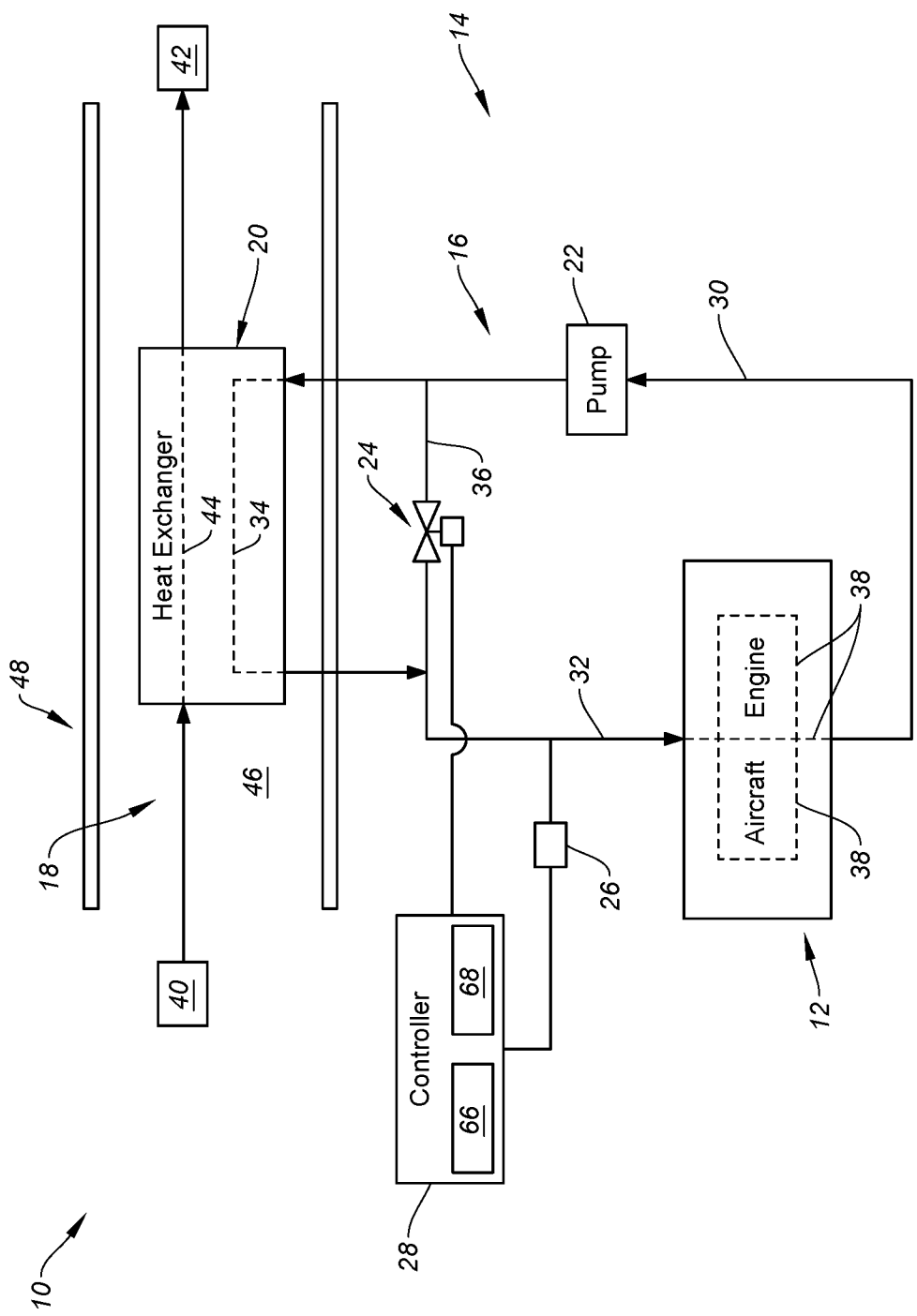
FIG. 1 is a partial schematic illustration of an aircraft system with a heat exchange system servicing an aircraft engine.

FIG. 1 partially schematically illustrates a system 10 for an aircraft. This aircraft may be an airplane, a helicopter, a drone (e.g., an unmanned aerial vehicle (UAV)) or any other manned or unmanned aerial vehicle or system. The aircraft system 10 may be configured as, or otherwise included as part of, a propulsion system for the aircraft. The aircraft system 10 may also or alternatively be configured as, or otherwise included as part of, an electrical power system for the aircraft. The aircraft system 10 of FIG. 1 includes an aircraft engine 12 and a heat exchange system 14 for the aircraft engine 12.

The aircraft engine 12 may be configured as or otherwise include an intermittent internal combustion (IC) engine or a continuous internal combustion (IC) engine. Examples of the intermittent IC engine include a reciprocating piston engine, a rotary engine (e.g., a Wankel engine) and a pulsejet engine. An example of the continuous IC engine is a gas turbine engine. Examples of the gas turbine engine include a turboprop engine, a turboshaft engine, a turbofan engine, a propfan engine, a pusher fan engine and an auxiliary power unit (APU) engine. The present disclosure, however, is not limited to the foregoing exemplary aircraft engine types or configurations. Moreover, it is contemplated the heat exchange system 14 described below may also or alternatively service one or more other components and/or systems onboard the aircraft; e.g., electrical systems, cabin air systems, etc.

The heat exchange system 14 of FIG. 1 includes a lubricant flow circuit 16, a cooling circuit 18 and a heat exchanger 20 thermally coupling the lubricant flow circuit 16 with the cooling circuit 18. The heat exchange system 14 of FIG. 1 also includes a pump 22, an electric bypass valve 24, a sensor 26 and a controller 28.

The lubricant flow circuit 16 may be configured as a close-loop flow circuit. The lubricant flow circuit 16 of FIG. 1, for example, includes a lubricant first passage 30, a lubricant second passage 32, a lubricant heat exchanger passage 34 of (e.g., formed by and within) the heat exchanger 20, a lubricant bypass passage 36, and one or more lubricant flow passages 38 of (e.g., formed by and within) the aircraft engine 12. The first passage 30 is configured as a lubricant return passage from the aircraft engine 12 and/or a lubricant inlet passage to the heat exchanger 20. The second passage 32 is configured as a lubricant feed passage to the aircraft engine 12 and/or a lubricant outlet passage from the heat exchanger 20. The heat exchanger passage 34 extends through and/or otherwise along the heat exchanger 20. The bypass passage 36 is disposed outside of and may be thermally decoupled from the heat exchanger 20. The flow passages 38 extend in, through and/or otherwise along one or more components and/or systems of the aircraft engine 12. One or more of these flow passages 38 are configured to deliver lubricant (e.g., engine oil) to the aircraft engine components and/or systems for lubrication and/or cooling. One or more of the flow passages 38 are also or alternatively configured to receive the lubricant following the lubrication and/or the cooling.

The heat exchanger passage 34 and the bypass passage 36 are arranged between and fluidly coupled in parallel with the first passage 30 and the second passage 32. The bypass passage 36 may thereby provide a bypass around the heat exchanger 20. The flow passages 38 are arranged between and fluidly coupled with (in series and/or in parallel) the first passage 30 and the second passage 32. The first passage 30 is arranged between and fluidly coupled with (a) the flow passages 38 and (b) the heat exchanger passage 34 and the bypass passage 36. This first passage 30 of FIG. 1 is downstream of the flow passages 38 and upstream of the heat exchanger passage 34 and the bypass passage 36. The second passage 32 is arranged between and fluidly coupled with (a) the heat exchanger passage 34 and the bypass passage 36 and (b) the flow passages 38. This second passage 32 of FIG. 1 is downstream of the heat exchanger passage 34 and the bypass passage 36 and upstream of the flow passages 38.

The cooling circuit 18 may be configured as an open-loop flow circuit. The cooling circuit 18 of FIG. 1, for example, extends longitudinally from an inlet 40 into the cooling circuit 18 to an outlet 42 from the cooling circuit 18. The cooling circuit 18 of FIG. 1 includes a cooling heat exchanger passage 44 ("cooling passage") of (e.g., formed by and within) the heat exchanger 20. This cooling passage 44 extends through and/or otherwise along the heat exchanger 20, and is between the cooling circuit inlet 40 and the cooling circuit outlet 42. In some embodiments, the cooling circuit 18 may be configured as an air circuit. With such an arrangement, both the cooling circuit inlet 40 and the cooling circuit outlet 42 may be (e.g., directly or indirectly) fluidly coupled to an environment external to the aircraft. The cooling circuit inlet 40, for example, may be configured as a ram air inlet and the cooling circuit outlet 42 may be configured as a to-ambient vent. The present disclosure, however, is not limited to such an exemplary arrangement. The cooling circuit inlet 40, for example, may alternatively be a bleed orifice which is configured to bleed air from a flowpath (e.g., a core flowpath, a bypass flowpath, etc.) of the aircraft engine 12. Moreover, the cooling circuit 18 is not limited to flowing air nor to an open-loop configuration. It is contemplated, for example, the cooling circuit 18 may alternatively be a closed-loop flow circuit which flows a liquid coolant rather than air. However, for ease of description, the cooling circuit 18 is generally described below as the open-loop air circuit of FIG. 1.

The heat exchanger 20 of FIG. 1 is configured as a liquid-to-air heat exchanger; e.g., a radiator. The present disclosure, however, is not limited to such an exemplary configuration. The heat exchanger 20, for example, may alternatively be configured as a liquid-to-liquid heat exchanger where the cooling fluid passing through the cooling circuit 18 is the liquid coolant rather than air. Moreover, while the heat exchanger 20 of FIG. 1 is schematically depicted generally as a counterflow heat exchanger, the heat exchanger 20 may alternatively be configured as a parallel flow heat exchanger, a cross-flow heat exchanger or any other type of heat exchange device.

The heat exchanger 20 may be located remote from and outside of the aircraft engine 12. The heat exchanger 20 of FIG. 1, for example, is located within an under wing compartment 46 of an airframe 48 of the aircraft. It is contemplated, however, the heat exchanger 20 may alternatively be located with the aircraft engine 12; e.g., within a duct and/or a housing of the aircraft engine 12, within a nacelle covering the aircraft engine 12, etc.

The pump 22 is fluidly coupled inline along the lubricant flow circuit 16. The pump 22 of FIG. 1, for example, is fluidly coupled inline along the first passage 30. The pump 22 is configured to facilitate circulation of the lubricant within the lubricant flow circuit 16. More particularly, the pump 22 is configured to direct the lubricant out of the first passage 30, through the heat exchanger passage 34 and/or the bypass passage 36, and into the second passage 32.

The bypass valve 24 is fluidly coupled inline along the lubricant flow circuit 16. The bypass valve 24 of FIG. 1, for example, is fluidly coupled inline along the bypass passage 36 at, for example, an intermediation position along the bypass passage 36 between the first passage 30 and the second passage 32. This bypass valve 24 is configured to regulate flow of the lubricant through the bypass passage 36 from the first passage 30 to the second passage 32. The bypass valve 24 of FIGS. 2A and 2B, for example, includes a valve element 50 and an electric motor 52 (e.g., a variable frequency electric motor) configured to move (e.g., rotate) the valve element 50 between a (e.g., fully) closed position (see FIG. 2A) and an (e.g., fully) open position (see FIG. 2B). When the valve element 50 is in the closed position of FIG. 2A, the bypass valve 24 is (e.g., completely) closed and the valve element 50 blocks a flowpath 54 across the bypass valve 24. The bypass valve 24 may thereby fluidly decouple the first passage 30 from the second passage 32 along the bypass passage 36 (see FIG. 1). By contrast, when the valve element 50 is in the open position of FIG. 2B, the bypass valve 24 is (e.g., completely) open and the valve element 50 unblocks the flowpath 54 across the bypass valve 24. The bypass valve 24 may thereby fluidly couple the first passage 30 to the second passage 32 along the bypass passage 36 (see FIG. 1). The electric motor 52, of course, may also move the valve element 50 to one or more intermediate positions between the closed position of FIG. 2A and the open position of FIG. 2B; e.g., see intermediate position of FIG. 2C. The intermediate position(s) may be predetermined positions, or the bypass valve 24 may be configured as an infinitely adjustable valve without any predetermined intermediate position locations.

Figure 2A:
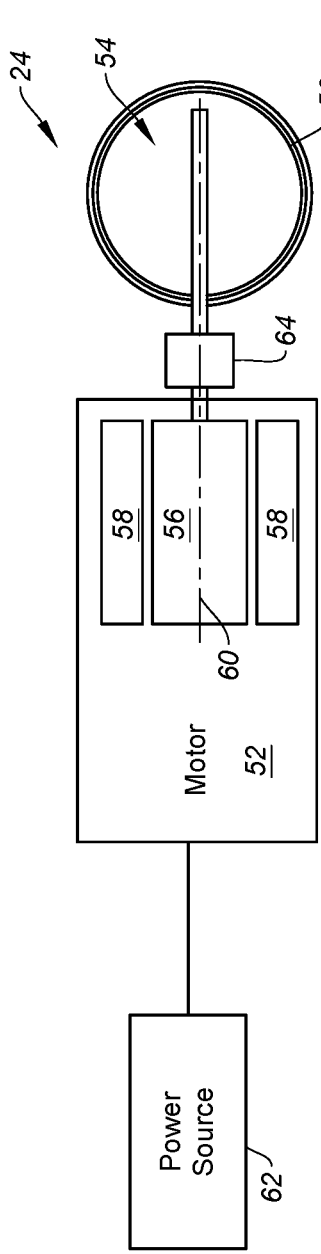
FIGS. 2A-C are schematic illustrations of an electric bypass valve coupled to an electric power source, where a valve element of the bypass valve is arranged in various positions.
Figure 2B:
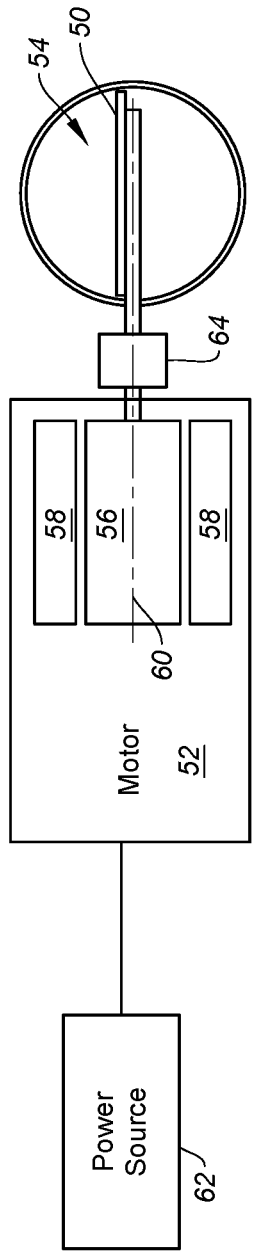
Figure 2C:
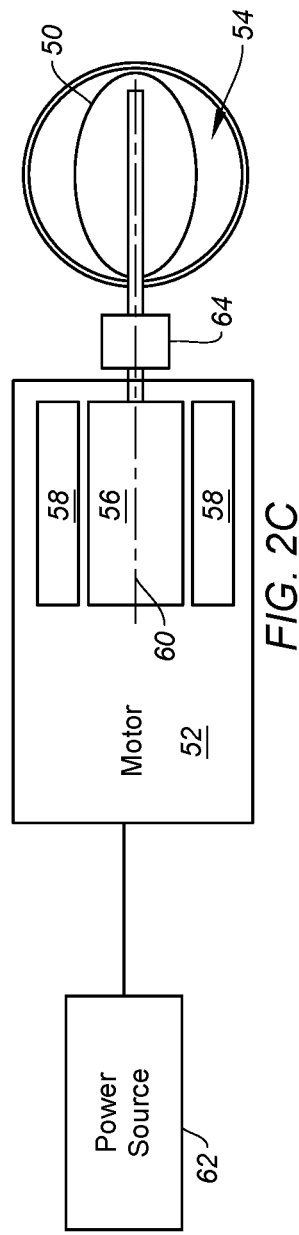

The electric motor 52 may be configured as a rotary electric motor such as an electric variable speed motor or an electric stepper motor. The electric motor 52 of FIGS. 2A-C, for example, includes a motor rotor 56 and a motor stator 58. The motor rotor 56 is rotatable about a rotational axis 60 of the electric motor 52. The motor stator 58 of FIGS. 2A-C is radially outboard of and circumscribes the motor rotor 56. With this arrangement, the electric motor 52 is configured as a radial flux electric motor. The electric motor 52 of the present disclosure, however, is not limited to such an exemplary rotor-stator configuration nor to radial flux arrangements. The motor rotor 56, for example, may alternatively be radially outboard of and circumscribe the motor stator 58. In another example, the motor rotor 56 may be axially next to the motor stator 58 configuring the electric motor 52 as an axial flux electric motor. The electric motor 52 may be configured as a direct current (DC) electric motor which runs off of direct current (DC) electricity received from an electric power source 62. Alternatively, the electric motor 52 may be configured as an alternating current (AC) electric motor which runs off of alternating current (AC) electricity received from the power source 62.

During operation of the bypass valve 24, the electric motor 52 converts electricity received from the power source 62 into mechanical power. The motor stator 58, for example, may generate an electromagnetic field with the motor rotor 56 using the electricity. This electromagnetic field may drive rotation of the motor rotor 56. The motor rotor 56 of FIGS. 2A-C is operatively connected to the valve element 50, for example, through a gear system 64. The rotation of the motor rotor 56 may thereby drive movement (e.g., rotation) of the valve element 50 between the closed position (see FIG. 2A) and the open position (see FIG. 2B), including the various intermediate positions (see FIG. 2C) between the closed position and the open position. In some embodiments, the electric motor 52 may also be utilized as a brake to hold a particular motor rotor position and, thus, a particular valve element position.

Referring to FIG. 1, the sensor 26 is arranged with the lubricant flow circuit 16. The sensor 26 of FIG. 1, for example, is located along the second passage 32 downstream of the heat exchanger passage 34 and/or the bypass passage 36. The present disclosure, however, is not limited to such an exemplary sensor location. The sensor 26, for example, may alternatively be arranged within the aircraft engine 12 or otherwise along the lubricant flow circuit 16; e.g., along the first passage 30. The sensor 26 of FIG. 1 is configured to measure a parameter of the lubricant flowing through the lubricant flow circuit 16. For example, the lubricant parameter may be or may be indicative of a temperature of the lubricant flowing through the lubricant flow circuit 16; e.g., a temperature of the lubricant flowing in the second passage 32 downstream of the heat exchanger passage 34 and/or the bypass passage 36. Here, the sensor 26 is configured as a temperature sensor. In another example, the lubricant parameter may be or may be indicative of a pressure of the lubricant flowing through the lubricant flow circuit 16; e.g., a pressure of the lubricant flowing in the second passage 32 downstream of the heat exchanger passage 34 and/or the bypass passage 36. Here, the sensor 26 is configured as a pressure sensor.

The controller 28 is in signal communication (e.g., hardwired and/or wirelessly coupled) with the sensor 26 and the bypass valve 24 (or the power source 62 of FIGS. 2A-C electrically powering the electric motor 52). The controller 28 may be implemented with a combination of hardware and software. The hardware may include a memory 66 and at least one processing device 68, which processing device 68 may include one or more single-core and/or multi-core processors. The hardware may also or alternatively include analog and/or digital circuitry other than that described above.

The memory 66 is configured to store software (e.g., program instructions) for execution by the processing device 68, which software execution may control and/or facilitate performance of one or more operations such as those described below. The memory 66 may be a non-transitory computer readable medium. For example, the memory 66 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

During operation of the heat exchange system 14 of FIG. 1, the lubricant is circulated through the lubricant flow circuit 16 using, for example, the pump 22. As the lubricant flows through the flow passages 38 of the aircraft engine 12, the aircraft engine 12 and its components may transfer heat energy into the lubricant. This heated lubricant may then be directed through the first passage 30 and into the heat exchanger 20 and its heat exchanger passage 34. As the lubricant flows through the heat exchanger passage 34, the heat exchanger 20 transfers at least some of the heat energy from the lubricant into the cooling fluid (e.g., air) flowing through the cooling passage 44. The heat exchanger 20 thereby cools the lubricant. This cooled lubricant may then be directed through the second passage 32 back to the aircraft engine 12 for lubricating and/or cooling the aircraft engine 12 and its respective components and/or systems.

During the heat exchange system operation, the controller 28 receives sensor data via a sensor signal or signals from the sensor 26. This sensor data is indicative of the lubricant parameter measured by the sensor 26. The controller 28 processes this sensor data to generate a control signal for controlling operation of the bypass valve 24. The controller 28, for example, may process the sensor data using a control program. Examples of this control program include, but are not limited to, a linear PI control program, a bang-bang control program or a pulse-width modulation (PWM) control program. Using the control program, the controller 28 may generate the control signal for the bypass valve 24 based on the sensor data/the measured lubricant parameter. This control signal may then be communicated (as needed) to the bypass valve 24 (or the power source 62 of FIGS. 2A-C electrically powering the electric motor 52) to control operation of the bypass valve 24 and its electric motor 52. For example, where the lubricant parameter is within an operating range (or is below a maximum operating threshold and/or is above a minimum operating threshold), the controller 28 may signal (or not signal) for the bypass valve 24 to remain in its current position; e.g., open, closed, or partially open. However, where the lubricant parameter is outside of or is predicted to move outside of the operating range (or is above or predicted to move above the maximum operating threshold) (or is below or is predicted to move below the minimum operating threshold), the controller 28 may signal for the bypass valve 24 to change its position to maintain the lubricant parameter within the operating range (or below the maximum operating threshold and/or above the minimum operating threshold).

As an example, the lubricant parameter may be or may be indicative of the temperature of the lubricant. Where this lubricant temperature dips below or is predicted to dip below the minimum operating threshold (e.g., a lower bound of the operating range), the controller 28 may signal for the bypass valve 24 to partially or completely open. As the bypass valve 24 opens, some (or all) of the lubricant may bypass the heat exchanger 20 by flowing through the bypass passage 36 from the first passage 30 to the second passage 32. As more of the lubricant bypass the heat exchanger 20, less of the lubricant is cooled by the heat exchanger 20. Thus, the lubricant flowing in the second passage 32—a mixture of the cooled lubricant from the heat exchanger passage 34 (when not completely bypassed) and the non-cooled lubricant from the bypass passage 36—may increase in temperature. By contrast, where the lubricant temperature rises above or is predicted to rise above the maximum operating threshold (e.g., an upper bound of the operating range), the controller 28 may signal for the bypass valve 24 to partially or completely close. As the bypass valve 24 closes, more (or all) of the lubricant flows through the heat exchanger passage 34 from the first passage 30 to the second passage 32. As more of the lubricant flows into the heat exchanger 20, more of the lubricant is cooled by the heat exchanger 20. Thus, the lubricant flowing in the second passage 32—the mixture of the cooled lubricant from the heat exchanger passage 34 and the non-cooled lubricant from the bypass passage 36 (when not completely closed)—may decrease in temperature.

By utilizing the electric motor 52 of FIGS. 2A-C to move the valve element 50, the bypass valve 24 may reduce or prevent limit cycle behavior. By contrast, a similarly situated passive thermal bypass valve may be subject to limit cycle behavior due to a natural frequency resonance between the thermal bypass valve and system flow and/or temperature dynamics. For example, the thermal bypass valve may regulate its opening/closing based on a narrow range of pre-set temperature thresholds. Limit cycle behavior may occur where the thermal bypass valve operates at or near a resonant frequency of the system flow and/or temperature dynamics. By contrast, the heat exchange system 14 and its bypass valve 24 and its controller 28 may provide a more rapid, fine-tuned and/or wider control bandwidth response. The bypass valve 24 and the controller 28 may also adjust its thresholds/operating ranges to reduce or prevent the limit cycle behavior; e.g., decouple the system dynamic resonances. Moreover, using the electric motor 52 (e.g., the variable frequency electric motor) may facilitate designing a robust frequency separation strategy to decouple the bypass valve 24 and system dynamics for the (e.g., entire) system operating range.

Figure 3:
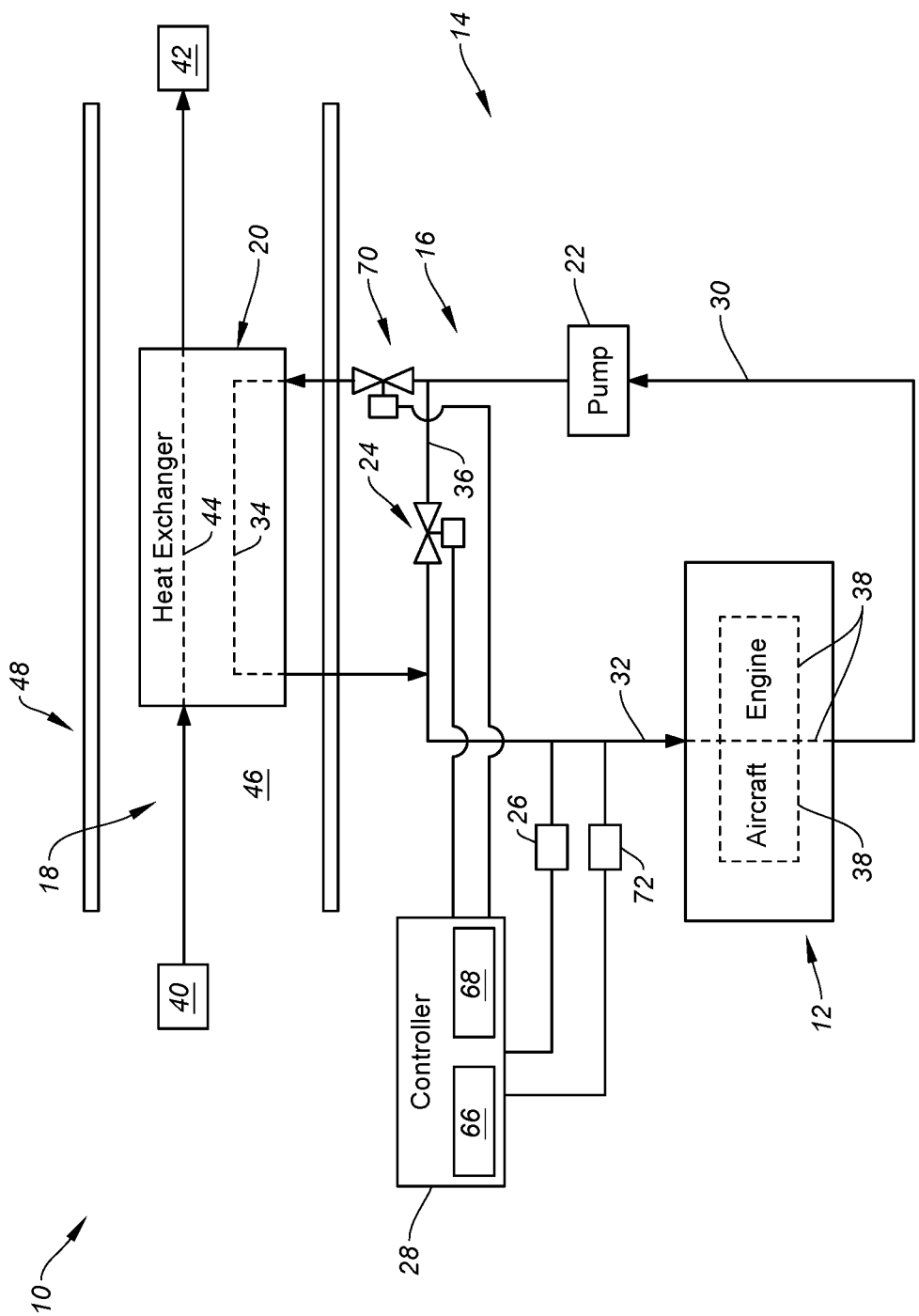
FIG. 3 is a partial schematic illustration of the aircraft system with an additional control valve for the heat exchange system.

In some embodiments, referring to FIG. 1, the heat exchange system 14 may be configured with a single valve associated with the heat exchanger 20—the bypass valve 24. In other embodiments, referring to FIG. 3, the heat exchange system 14 may also include a control valve 70, to improve the system temperature dynamic response. This control valve 70 is fluidly coupled inline along the lubricant flow circuit 16. The control valve 70 of FIG. 3, for example, is fluidly coupled inline along the first passage 30, for example, downstream of the pump 22. The control valve 70 is positioned upstream of the heat exchanger passage 34, and may also be positioned downstream of the bypass passage 36. In the embodiment of FIG. 3, whereas the bypass valve 24 is controlled based on the lubricant temperature, the control valve 70 may be controlled based on the lubricant pressure. More particularly, the controller 28 (or another discrete controller) may receive data from another sensor 72 (e.g., a pressure sensor) and control operation of the control valve 70 based on the sensor data from this other sensor 72. With this arrangement, the control valve 70 may be used to control the lubricant pressure across the heat exchanger passage 34 and hence the total flow through the heat exchanger 20, whether or not the lubricant is diverted into the bypass passage 36. Like the bypass valve 24, the control valve 70 may be actuated by an electric motor.

The heat exchange system 14 is described above with respect to cooling the lubricant for the aircraft engine 12. It is contemplated, however, a similar arrangement may also be utilized for cooling or otherwise controlling temperature of various other fluids; e.g., gases (e.g., air) or liquids (e.g., coolant, fuel, etc.). For example, the lubricant flow circuit 16 may alternatively be a cooling air circuit, a fuel circuit or otherwise.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a heat exchanger;
a lubricant flow circuit including an inlet passage, an outlet passage, a heat exchanger passage and a bypass passage, the heat exchanger passage extending through the heat exchanger, the bypass passage bypassing the heat exchanger, wherein the heat exchanger passage and the bypass passage are fluidly coupled in parallel between the inlet passage and the outlet passage; and
a bypass valve fluidly coupled inline along the lubricant flow circuit, the bypass valve operable to regulate lubricant flow through the bypass passage, and the bypass valve comprising a rotary electric motor.

2. The system of claim 1, further comprising a controller operable to control operation of the rotary electric motor based on a lubricant parameter.

3. The system of claim 2, wherein the lubricant parameter comprises a temperature of lubricant flowing in the lubricant flow circuit.

4. The system of claim 2, wherein the lubricant parameter comprises a pressure of lubricant flowing in the lubricant flow circuit.

5. The system of claim 2, wherein the controller is operable to control operation of the rotary electric motor to maintain the lubricant parameter within an operating range.

6. The system of claim 2, wherein the controller is operable to control operation of the rotary electric motor to maintain the lubricant parameter above a maximum operating threshold.

7. The system of claim 2, wherein the controller is operable to control operation of the rotary electric motor to maintain the lubricant parameter below a minimum operating threshold.

8. The system of claim 2, further comprising:
a sensor operatively connected to the lubricant flow circuit;
the sensor operable to communicate sensor signal to the controller indicative of the lubricant parameter.

9. The system of claim 8, wherein the sensor is operatively connected to the lubricant flow circuit at a point that is fluidly downstream of the heat exchanger passage and the bypass passage.

10. The system of claim 2, wherein
the bypass valve further comprises a valve element operatively connected to the rotary electric motor;
the controller is operable to control operation of the rotary electric motor to move the valve element between an open position and a closed position;
the bypass valve is operable to fluidly couple the inlet passage to the outlet passage with the bypass passage when the valve element is in the open position; and
the bypass valve is operable to fluidly decouple the inlet passage from the outlet passage along the bypass passage when the valve element is in the closed position.

11. The system of claim 10, wherein the controller is further operable to control operation of the rotary electric motor to move the valve element to and remain at one or more intermediate positions between the open position and the closed position.

12. The system of claim 1, wherein the rotary electric motor comprises a variable frequency electric motor operable to decouple system dynamic resonances of the system.

13. The system of claim 1, further comprising:
a control valve fluidly coupled inline along the lubricant flow circuit upstream of the bypass valve;
the control valve operable to regulate lubricant flow in the inlet passage upstream of the heat exchanger passage and the bypass passage.

14. The system of claim 13, wherein
the bypass valve is actuated based on a temperature of lubricant flowing in the lubricant flow circuit; and
the control valve is actuated based on a pressure of the lubricant flowing in the lubricant flow circuit.

15. The system of claim 1, wherein the heat exchanger is liquid-to-air heat exchanger.

16. The system of claim 1, wherein the heat exchanger is a liquid-to-liquid heat exchanger.

17. The system of claim 1, further comprising:
an aircraft engine; and
a heat exchange system including the heat exchanger, the lubricant flow circuit and the bypass valve, the outlet passage fluidly coupled with and upstream of one or more components of the aircraft engine.

18. A system for an aircraft, comprising:
a heat exchanger;
a lubricant flow circuit including an inlet passage, an outlet passage, a heat exchanger passage and a bypass passage, the heat exchanger passage extending through the heat exchanger, the bypass passage bypassing the heat exchanger, and the heat exchanger passage and the bypass passage between and fluidly coupled in parallel with the inlet passage and the outlet passage; and
a bypass valve fluidly coupled inline along the lubricant flow circuit, the bypass valve operable to regulate lubricant flow through the bypass passage, and the bypass valve comprising a variable speed electric motor.

19. A system for an aircraft, comprising:
a heat exchanger;
a fluid flow circuit including an inlet passage, an outlet passage, a heat exchanger passage and a bypass passage, the heat exchanger passage extending through the heat exchanger, the bypass passage bypassing the heat exchanger, and the heat exchanger passage and the bypass passage between and fluidly coupled in parallel with the inlet passage and the outlet passage; and a valve system including a bypass valve and a control valve;

the bypass valve fluidly coupled inline along the fluid flow circuit, the valve system operable to regulate fluid flow through the bypass passage using the bypass valve based on a temperature of fluid flowing in the fluid flow circuit, and the bypass valve comprising an electric motor; and the control valve fluidly coupled inline along the fluid flow circuit downstream of the bypass valve, the valve system operable to regulate fluid flow in the-inlet passage using the control valve based on a pressure of the fluid flowing in the fluid flow circuit.

20. The system of claim 19, wherein the bypass valve further comprises a valve element; and the electric motor comprises a rotary electric motor operatively connected to the valve element.

* * * * *